US012744626B2

(12) United States Patent
Ijaz et al.

(10) Patent No.: US 12,744,626 B2
(45) Date of Patent: Sep. 22, 2026

(54) METHOD, USER EQUIPMENT, AND NETWORK NODE

(71) Applicant: NEC Corporation, Tokyo (JP)

(72) Inventors: Ayesha Ijaz, Leatherhead (GB); Takahiro Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 251 days.

(21) Appl. No.: 18/284,186

(22) PCT Filed: Mar. 17, 2022

(86) PCT No.: PCT/JP2022/012479
§ 371 (c)(1),
(2) Date: Sep. 26, 2023

(87) PCT Pub. No.: WO2022/210000
PCT Pub. Date: Oct. 6, 2022

(65) Prior Publication Data

US 2024/0171320 A1 May 23, 2024

(30) Foreign Application Priority Data

Apr. 1, 2021 (GB) ..................................... 2104751

(51) Int. Cl.

| | |
|---|---|
| ***H04L 1/1829*** | (2023.01) |
| ***H04W 72/23*** | (2023.01) |
| ***H04W 76/28*** | (2018.01) |
| *H04L 1/1812* | (2023.01) |

(52) U.S. Cl.
CPC ........... *H04L 1/1854* (2013.01); *H04W 72/23* (2023.01); *H04W 76/28* (2018.02); *H04L 1/1812* (2013.01)

(58) Field of Classification Search
CPC ... H04L 1/1854; H04L 1/1812; H04L 1/1896; H04L 1/1822; H04L 1/1825; H04W 72/23; H04W 76/28
USPC ........................................ 370/310, 328, 329
See application file for complete search history.

(56) References Cited

U.S. PATENT DOCUMENTS

2020/0295824 A1 9/2020 Charbit et al.
2020/0313806 A1 10/2020 Wang et al.
2021/0029679 A1 1/2021 Si et al.
2021/0105761 A1* 4/2021 Cheng .................. H04L 5/0053
(Continued)

FOREIGN PATENT DOCUMENTS

CN 111919503 A 11/2020
WO 2020/065530 4/2020
WO 2020/189932 A1 9/2020
(Continued)

OTHER PUBLICATIONS

JP Office Action for Japanese Patent Application No. 2023-559105, mailed on Sep. 3, 2024 with English Translation.
(Continued)

*Primary Examiner* — Obaidul Huq

(57) ABSTRACT

A communication system is disclosed in which a user equipment (UE) communicates with a network node via a non-terrestrial network. The UE receives from the network node an indication that HARQ feedback is not required for a set of transmission occasions, and the UE omits HARQ feedback for that set of transmission occasions based on the information. The indication may be included in a DCI field or a MAC header.

7 Claims, 5 Drawing Sheets

(56) References Cited

U.S. PATENT DOCUMENTS

| | | | | |
|---|---|---|---|---|
| 2022/0029733 | A1* | 1/2022 | Ye | H04B 7/1851 |
| 2022/0109529 | A1* | 4/2022 | Ye | H04W 52/50 |

FOREIGN PATENT DOCUMENTS

| | | | | |
|---|---|---|---|---|
| WO | 2020/189941 A1 | 9/2020 | | |
| WO | 2021/018221 A1 | 2/2021 | | |
| WO | 2021/024121 A1 | 2/2021 | | |
| WO | 2021/029296 A1 | 2/2021 | | |
| WO | WO-2021018051 A1 * | 2/2021 | | H04W 72/23 |
| WO | 2021/052210 A1 | 3/2021 | | |

OTHER PUBLICATIONS

Moderator (ZTE), "Summary#4 of Al 8.4.3 for HARQ for NTN", 3GPP TSG RAN WG1 #104-e R1-2102143, Feb. 5, 2021.

International Search Report for PCT Application No. PCT/JP2022/012479, mailed on Jun. 1, 2022.

Written opinion for PCT Application No. PCT/JP2022/012479, mailed on Jun. 1, 2022.

GB Search Report for GB Application No. 2104751.9, mailed on Aug. 25, 2021.

NGMN 5G White Paper V1.0 by the Next Generation Mobile Networks (NGMN) Alliance, Feb. 17, 2015 URL: https://www.ngmn.org/5g-white-paper.html.

3GPP TS 38.300 V16.4.0 (Dec. 2020), "3rd Generation Partnership Project; Technical Specification Group Radio Access Network; NR; NR and NG-RAN Overall Description; Stage 2 (Release 16)".

3GPP TS 37.340 V16.4.0 (Dec. 2020), 3rd Generation Partnership Project; Technical Specification Group Radio Access Network; Evolved Universal Terrestrial Radio Access (E-UTRA) and NR; Multi-connectivity; Stage 2 (Release 16).

3GPP TR 38.811 V15.4.0 (Sep. 2020), "3rd Generation Partnership Project; Technical Specification Group Radio Access Network; Study on New Radio (NR) to support non-terrestrial networks (Release 15)".

3GPP TR 38.821 V16.0.0 (Dec. 2019), "3rd Generation Partnership Project; Technical Specification Group Radio Access Network; Solutions for NR to support non-terrestrial networks (NTN) (Release 16)".

3GPP TS 38.213 V16.5.0 (Mar. 2021), "3rd Generation Partnership Project; Technical Specification Group Radio Access Network; NR; Physical layer procedures for control (Release 16)".

3GPP TR 38.912 V16.0.0 (Jul. 2020), "3rd Generation Partnership Project; Technical Specification Group Radio Access Network; Study on New Radio (NR) access technology (Release 16)".

Thales, Solutions for NR to support non-terrestrial networks (NTN), 3GPP TSG RAN meeting #86, RP-193234, Dec. 9-13, 2019.

RAN1 Chairman's Note, 3GPP TSG RAN WG1 Meeting #104-e, e-Meeting, Jan. 25-Feb. 5, 2021.

LG Electronics, "Discussions on HARQ enhancements in NTN", 3GPP TSG RAN WG1 #104-e, R1-2100705, Jan. 19, 2021.

CATT, "HARQ operation enhancement for NTN", 3GPP TSG RAN WG1 #104-e, R1-2100383, Jan. 19, 2021.

ZTE, "Discussion on HARQ for NTN", 3GPP TSG RAN WG1 #104e, R1-2100246, Jan. 18, 2021.

Chinese Office Action for CN Application No. 202280025342.1, mailed on Jun. 16, 2026 with English Translation.

Ailing Wang, Progress in 3GPP Standardization of Satellite-Terrestrial Integration and Prospects for 6G, Sep. 2020.

3GPP TS 38.213 V15.5.0 (Mar. 2019).

* cited by examiner

3

6 architecture option 1 architecture option 2 architecture option 3 architecture option 4

METHOD, USER EQUIPMENT, AND NETWORK NODE

This application is a National Stage Entry of PCT/JP2022/012479 filed on Mar. 17, 2022, which claims priority from British Patent Application 2104751.9 filed on Apr. 1, 2021, the contents of all of which are incorporated herein by reference, in their entirety.

TECHNICAL FIELD

The present disclosure relates to communication system.

BACKGROUND ART

The present invention relates to a wireless communication system and devices thereof operating according to the 3rd Generation Partnership Project (3GPP) standards or equivalents or derivatives thereof. The disclosure has particular but not exclusive relevance to improvements relating to the Hybrid Automatic Repeat Request (HARQ) process in the so-called '5G' (or 'Next Generation') systems employing a non-terrestrial portion comprising airborne or spaceborne network nodes.

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

The latest developments of the 3GPP standards are the so-called '5G' or 'New Radio' (NR) standards which refer to an evolving communication technology that is expected to support a variety of applications and services such as Machine Type Communications (MTC), Internet of Things (IoT)/Industrial Internet of Things (IIoT) communications, vehicular communications and autonomous cars, high resolution video streaming, smart city services, and/or the like. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

End-user communication devices are commonly referred to as User Equipment (UE) which may be operated by a human or comprise automated (MTC/IoT) devices. Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). 3GPP Technical Specification (TS) 38.300 V16.4.0 and TS 37.340 V16.4.0 define the following nodes, amongst others:

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP is also working on specifying an integrated satellite and terrestrial network infrastructure in the context of 5G. The term Non-Terrestrial Networks (NTN) refers to networks, or segments of networks, that are using an airborne or spaceborne vehicle for transmission. Satellites refer to spaceborne vehicles in Geostationary Earth Orbit (GEO) or in Non-Geostationary Earth Orbit (NGEO) such as Low Earth Orbits (LEO), Medium Earth Orbits (MEO), and Highly Elliptical Orbits (HEO). Airborne vehicles refer to High Altitude Platforms (HAPs) encompassing Unmanned Aircraft Systems (UAS)—including tethered UAS, Lighter than Air UAS and Heavier than Air UAS—all operating quasi-stationary at an altitude typically between 8 and 50 km.

3GPP Technical Report (TR) 38.811 V15.4.0 is a study on New Radio to support such Non-Terrestrial Networks. The study includes, amongst others, NTN deployment scenarios and related system parameters (such as architecture, altitude, orbit etc.) and a description of adaptation of 3GPP channel models for Non-Terrestrial Networks (propagation conditions, mobility, etc.). 3GPP TR 38.821 V16.0.0 provides further details about NTN.

Non-Terrestrial Networks are expected to:

- help foster the 5G service roll out in un-served or under-served areas to upgrade the performance of terrestrial networks;
- reinforce service reliability by providing service continuity for user equipment or for moving platforms (e.g. passenger vehicles-aircraft, ships, high speed trains, buses);
- increase service availability everywhere; especially for critical communications, future railway/maritime/aeronautical communications; and
- enable 5G network scalability through the provision of efficient multicast/broadcast resources for data delivery towards the network edges or even directly to the user equipment.

NTN access typically features the following elements (amongst others):

- NTN Terminal: It may refer to a 3GPP UE or a terminal specific to the satellite system in case the satellite doesn't serve directly 3GPP UEs.
- A service link which refer to the radio link between the user equipment and the space/airborne platform (which may be in addition to a radio link with a terrestrial based RAN).
- A space or an airborne platform.
- Gateways ('NTN Gateways') that connect the satellite or aerial access network to the core network. It will be appreciated that gateways will mostly likely be co-located with a base station.
- Feeder links which refer to the radio links between the gateways and the space/airborne platform.

Satellite or aerial vehicles may generate several beams over a given area to provide respective NTN cells. The beams have a typically elliptic footprint on the surface of the Earth.

3GPP intends to support three types of NTN beams or cells:

- Earth-fixed cells characterized by at least one beam covering the same geographical areas all the time (e.g. GEO satellites and HAPS);
- quasi-Earth-fixed cells characterized by at least one beam covering one geographic area for a finite period and a different geographic area during another period (e.g. NGEO satellites generating steerable beams); and
- Earth-moving cells characterized by at least one beam covering one geographic area at one instant and a different geographic area at another instant (e.g. NGEO satellites generating fixed or non-steerable beams).

With satellite or aerial vehicle keeping position fixed in terms of elevation/azimuth with respect to a given earth point e.g. GEO and UAS, the beam footprint is earth fixed.

With satellite circulating around the earth (e.g. LEO) or on an elliptical orbit around the earth (e.g. HEO) the beam footprint may be moving over the Earth with the satellite or aerial vehicle motion on its orbit. Alternatively, the beam footprint may be Earth-fixed (or quasi-Earth-fixed) temporarily, in which case an appropriate beam pointing mechanism (mechanical or electronic steering) may be used to compensate for the satellite or aerial vehicle motion.

LEO satellites may have steerable beams in which case the beams are temporarily directed to substantially fixed footprints on the Earth. In other words, the beam footprints (which represent NTN cell) are stationary on the ground for a certain amount of time before they change their focus area over to another NTN cell (due to the satellite's movement on its orbit). From cell coverage/UE point of view, this results in cell changes happening regularly at discrete intervals because different Physical Cell Identities (PCIs) and/or Synchronization Signal/Physical Broadcast Channel (PBCH) blocks (SSBs) have to be assigned after each service link change, even when these beams serve the same land area (have the same footprint). LEO satellites without steerable beams cause the beams (cells) moving on the ground constantly in a sweeping motion as the satellite moves along its orbit and as in the case of steerable beams, service link change and consequently cell changes happen regularly at discrete intervals.

Similarly to service link changes, feeder link changes also happen at regular intervals due to the satellite's movement on its orbit. Both service and feeder link changes may be performed between different base stations/gateways (which may be referred to as an 'inter-gNB radio link switch') or within the same base station/gateway ('intra-gNB radio link switch').

The Physical Uplink Control Channel (PUCCH) carries a set of information called Uplink Control Information (UCI). The UCI may also be transmitted via the Physical Uplink Shared Channel (PUSCH). The UCI used in NR (5G) includes one or more of the following information: Channel State Information (CSI); HARQ feedback (ACK/NAK); and Scheduling Request (SR). This is generally the same as in LTE (4G).

Normally, the HARQ feedback is provided in the form of a codebook (a string of bits), the bits of the codebook representing which data has been received successfully and which not. The type of codebook to be used (e.g. 'Type-1', 'Type-2', or 'Type-3') is determined based on appropriate RRC parameters. Each type of codebook is divided into two cases depending on whether the HARQ feedback is reported using PUCCH or PUSCH.

In order to support NTN, a number of enhancements relating to HARQ are being considered by 3GPP, such as enhancements relating to the number of HARQ process, and enabling/disabling HARQ feedback as described in 3GPP TR 38.821. HARQ disabling is recommended by 3GPP in order to minimise the throughput impact of long propagation delays in NTN.

So far, the following agreements have been made relating to enabling/disabling HARQ feedback:

- Enabling/disabling on HARQ feedback for downlink transmission should be at least configurable per HARQ process via UE specific RRC signaling.
- For a downlink (DL) HARQ process with disabled HARQ feedback, the UE is not expected to receive another PDSCH or set of slot-aggregated PDSCH scheduled for the given HARQ process that starts until 'X' after the end of the reception of the last PDSCH or slot-aggregated PDSCH for that HARQ process. The value of X and units is yet to be defined.
- For Type-1 HARQ codebook, further discussion is needed regarding whether to report NACK on disabled processes and whether to reduce codebook size with criteria.
- For a DL HARQ process with disabled HARQ feedback, the UE is not expected to receive another PDSCH or set of slot-aggregated PDSCH scheduled for the given HARQ process that starts until 'X' after the end of the reception of the last PDSCH or slot-aggregated PDSCH for that HARQ process. The working assumption is that X=T_proc,1. It is yet to be decided whether X should be changed to X=max(T_proc,1, K1) where K1 is the minimum k1 if it is configured, otherwise k1=0.
- For Type-1 HARQ codebook, a straightforward way is to reuse the existing semi-static HARQ-ACK determination scheme. However, when a large number of HARQ processes are disabled, reducing the codebook size is considered beneficial to reduce the resources for UL and also reduce the power consumption of UE.

SUMMARY OF INVENTION

Technical Problem

A recent proposal by Vivo is recommended by 3GPP as the baseline for further discussion for reducing type 1 codebook size. This proposal relates to a special case where only disabled HARQ processes are transmitted within each occasion for candidate PDSCH receptions (referred to as $M_{A,c}$ occasions in accordance with clause 9.1.2.1 of 3GPP TS 38.213 V16.5.0). In this case, HARQ-ACK feedback can be omitted.

The inventors have identified a problem with this proposal. Specifically, when all HARQ processes in the $M_{A,c}$ occasions for a UE are disabled, there may be ambiguity between the base station and the UE since the UE cannot know if all HARQ processes are disabled in case of Discontinuous Transmission (DTX) or Downlink Control Information (DCI) miss detection. Therefore, it is not clear how does the UE know if only disabled HARQ processes are used in case of DTX or DCI miss detection.

Accordingly, the present invention seeks to provide methods and associated apparatus that address or at least alleviate (at least some of) the above described issues.

Although for efficiency of understanding for those of skill in the art, the invention will be described in detail in the context of a 3GPP system (5G networks including NTN), the principles of the invention can be applied to other systems as well.

Solution to Problem

In one aspect, the present invention provides a method performed by a user equipment (UE) configured to communicate via a non-terrestrial network, the method comprising: receiving, from a network node, information indicating whether HARQ feedback is required for a set of transmission occasions; and transmitting or omitting HARQ feedback for that set of transmission occasions based on said information.

In one aspect, the present invention provides a method performed by a network node configured to communicate with a user equipment (UE) via a non-terrestrial network, the method comprising: transmitting, to the UE, information indicating whether HARQ feedback is required for a set of transmission occasions; and receiving or omitting HARQ feedback for that set of transmission occasions based on said information.

In one aspect, the present invention provides a user equipment (UE) configured to communicate via a non-terrestrial network, the UE comprising: means for receiving, from a network node, information indicating whether HARQ feedback is required for a set of transmission occasions; and means for transmitting or omitting HARQ feedback for that set of transmission occasions based on said information.

In one aspect, the present invention provides a network node configured to communicate with a user equipment (UE) via a non-terrestrial network, the network node comprising: means for transmitting, to the UE, information indicating whether HARQ feedback is required for a set of transmission occasions; and means for receiving or for omitting HARQ feedback for that set of transmission occasions based on said information.

In one aspect, the present invention provides a user equipment (UE) configured to communicate via a non-terrestrial network, the UE comprising a processor, a transceiver, and a memory storing instructions; wherein the controller is configured to control the transceiver to: receive, from a network node, information indicating whether HARQ feedback is required for a set of transmission occasions; and transmit or omit HARQ feedback for that set of transmission occasions based on said information.

In one aspect, the present invention provides a network node configured to communicate with a user equipment (UE) via a non-terrestrial network, the network node comprising a processor, a transceiver, and a memory storing instructions; wherein the controller is configured to control the transceiver to: transmit, to the UE, information indicating whether HARQ feedback is required for a set of transmission occasions; and receive or omit HARQ feedback for that set of transmission occasions based on said information.

Aspects of the invention extend to corresponding systems, apparatus, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example, with reference to the accompanying drawings in which.

DESCRIPTION OF EMBODIMENTS

Overview

Figure 1:
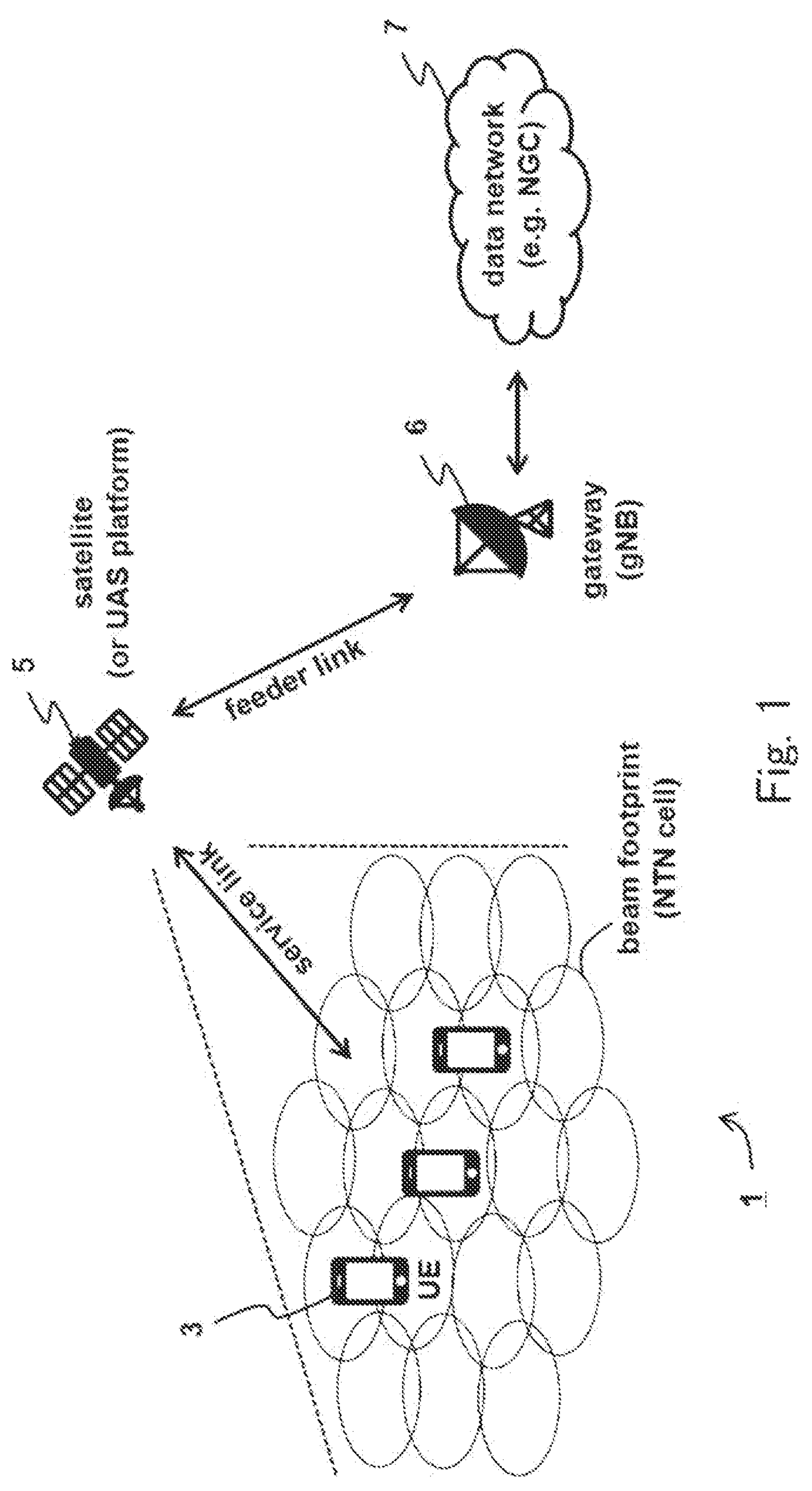
FIG. 1 illustrates schematically a mobile (cellular or wireless) telecommunication system to which embodiments of the invention may be applied.

FIG. 1 illustrates schematically a mobile (cellular or wireless) telecommunication system 1 to which embodiments of the invention may be applied.

In this system 1, users of mobile devices 3 (UEs) can communicate with each other and other users via access network nodes respective satellites 5 and/or base stations 6 and a data network 7 using an appropriate 3GPP radio access technology (RAT), for example, an E-UTRA and/or 5G RAT. As those skilled in the art will appreciate, whilst three mobile devices 3, one satellite 5, and one base station 6 are shown in FIG. 1 for illustration purposes, the system, when implemented, will typically include other satellites/UAS platforms, base stations/RAN nodes, and mobile devices (UEs).

It will be appreciated that a number of base stations 6 form a (radio) access network or (R)AN, and a number of NTN nodes 5 (satellites and/or UAS platforms) form a Non-Terrestrial Network (NTN). Each NTN node 5 is connected to an appropriate gateway (in this case co-located with a base station 6) using a so-called feeder link and connected to respective UEs 3 via corresponding service links. Thus, when served by an NTN node 5, a mobile device 3 communicates data to and from a base station 6 via the NTN node 5, using an appropriate service link (between the mobile device 3 and the NTN node 5) and a feeder link (between the NTN node 5 and the gateway/base station 6). In other words, the NTN forms part of the (R)AN, although it may also provide satellite communication services independently of E-UTRA and/or 5G communication services.

It will be appreciated that a number of base stations 6 form a (radio) access network or (R)AN, and a number of NTN nodes 5 (satellites and/or UAS platforms) form a Non-Terrestrial Network (NTN). Each NTN node 5 is connected to an appropriate gateway (in this case co-located with a base station 6) using a so-called feeder link and connected to respective UEs 3 via corresponding service links. Thus, when served by an NTN node 5, a mobile device 3 communicates data to and from a base station 6 via the NTN node 5, using an appropriate service link (between the mobile device 3 and the NTN node 5) and a feeder link (between the NTN node 5 and the gateway/base station 6). In other words, the NTN forms part of the (R)AN, although it may also provide satellite communication services independently of E-UTRA and/or 5G communication services.

Although not shown in FIG. 1, neighbouring base stations 6 are connected to each other via an appropriate base station to base station interface (such as the so-called 'X2' interface, 'Xn' interface and/or the like). The base station 6 is also connected to the data network nodes via an appropriate interface (such as the so-called 'S1', 'NG-C', 'NG-U' interface, and/or the like).

The data (or core) network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the data network 7 of a 'Next Generation'/5G system will include user plane entities and control plane entities, such as one or more control plane functions (CPFs) and one or more user plane functions (UPFs). The data network 7 is also coupled to other data networks such as the Internet or similar Internet Protocol (IP) based networks (not shown in FIG. 1).

Each NTN node 5 controls a number of directional beams via which associated NTN cells may be provided. Specifically, each beam has an associated footprint on the surface of the Earth which corresponds to an NTN cell. Each NTN cell (beam) has an associated Physical Cell Identity (PCI) and/or beam identity. The beam footprints may be moving as the NTN node 5 is travelling along its orbit. Alternatively, the beam footprint may be earth fixed, in which case an appropriate beam pointing mechanism (mechanical or electronic steering) may be used to compensate for the movement of the NTN node 5.

In their communications with each other, the UE 3 and the base station 6 communicate data organised into transport blocks (TBs) and provide associated HARQ feedback (one bit per TB) to confirm whether or not the data has been received and decoded successfully. The Medium Access Control (MAC) layer the UE 3 and the base station 6 (also referred to as the 'MAC entity') includes a HARQ entity for each serving cell, which maintains a number of parallel HARQ processes. Each HARQ process is associated with a HARQ process identifier.

In this system, at least when communicating via the NTN, it is possible to enable/disable HARQ feedback (per HARQ process). Accordingly, HARQ-ACK feedback can be omitted in cases when only disabled HARQ processes are transmitted within each occasion for candidate PDSCH receptions ($M_{A,c}$ occasions).

The base station 6 is configured to transmit a dynamic indication to the UE 3 that only disabled HARQ processes would be/have been used for the UE 3 during the relevant $M_{A,c}$ occasions. For example, an appropriate field of the DCI or value in the MAC header may be used to convey such an indication. Based on the indication, the UE 3 can determine whether only disabled HARQ processes would be/have been used during the relevant $M_{A,c}$ occasions and provide/omit HARQ-ACK feedback accordingly.

Beneficially therefore, even in case of DTX or DCI miss detection, it is possible to avoid ambiguity between the base station 6 and the UE 3 when only disabled HARQ processes are used (thus HARQ-ACK feedback is omitted). Moreover, this approach does not require any additional signalling overhead.

User Equipment (UE)

Figure 2:
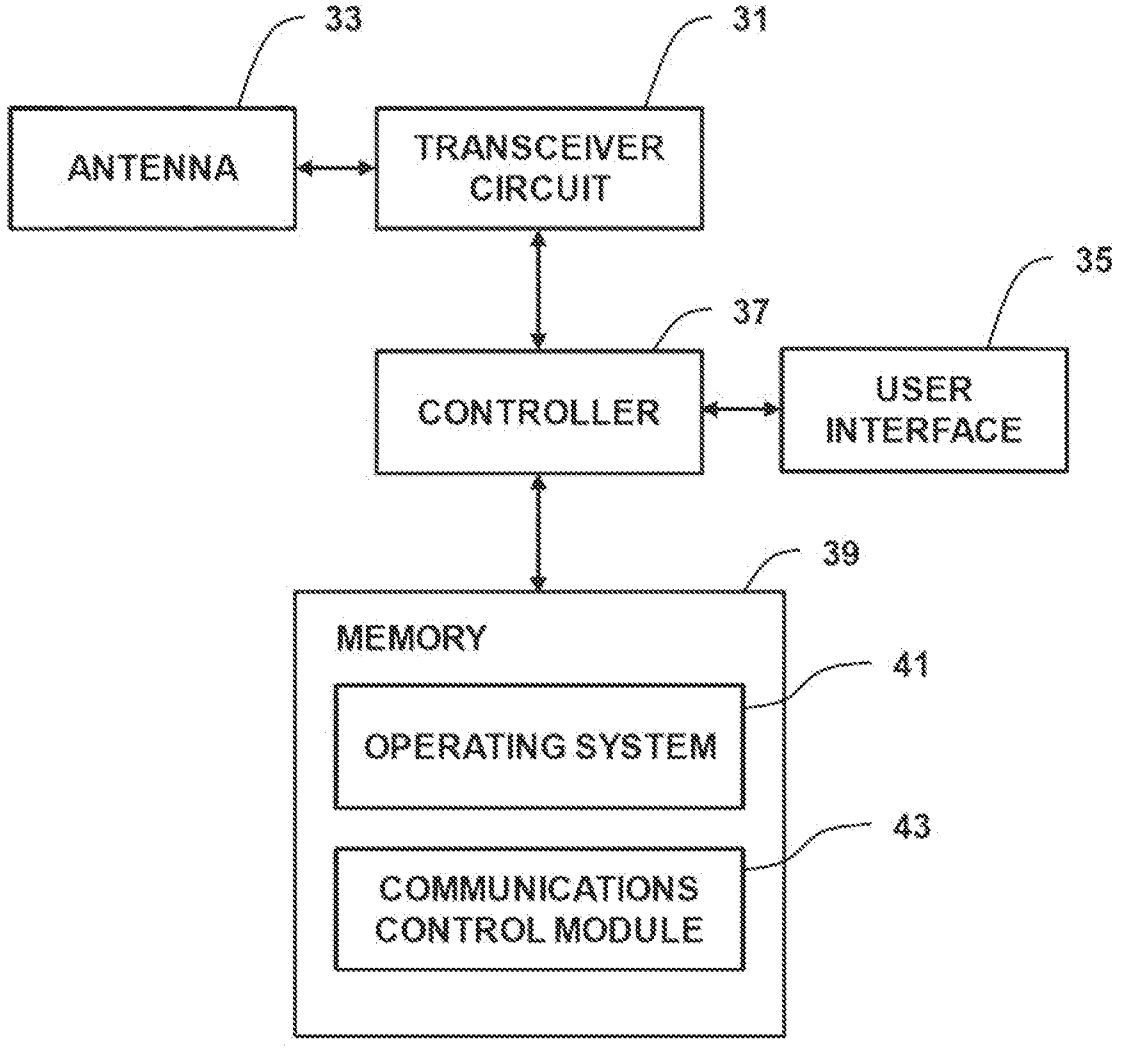
FIG. 2 is a schematic block diagram of a mobile device forming part of the system shown in FIG. 1.
Figure 2:

FIG. 2 is a block diagram illustrating the main components of the mobile device (UE) 3 shown in FIG. 1. As shown, the UE 3 includes a transceiver circuit 31 which is operable to transmit signals to and to receive signals from the at least one connected node via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, and a communications control module 43.

The communications control module 43 is responsible for handling (generating/sending/receiving) signalling messages and uplink/downlink data packets between the UE 3 and other nodes, including NTN nodes 5, (R)AN nodes 6, and core network nodes. The signalling may comprise control signalling related to HARQ processes/HARQ feedback (e.g. enabling/disabling HARQ feedback, per HARQ process).

NTN Node (Satellite/UAS Platform)

Figure 3:
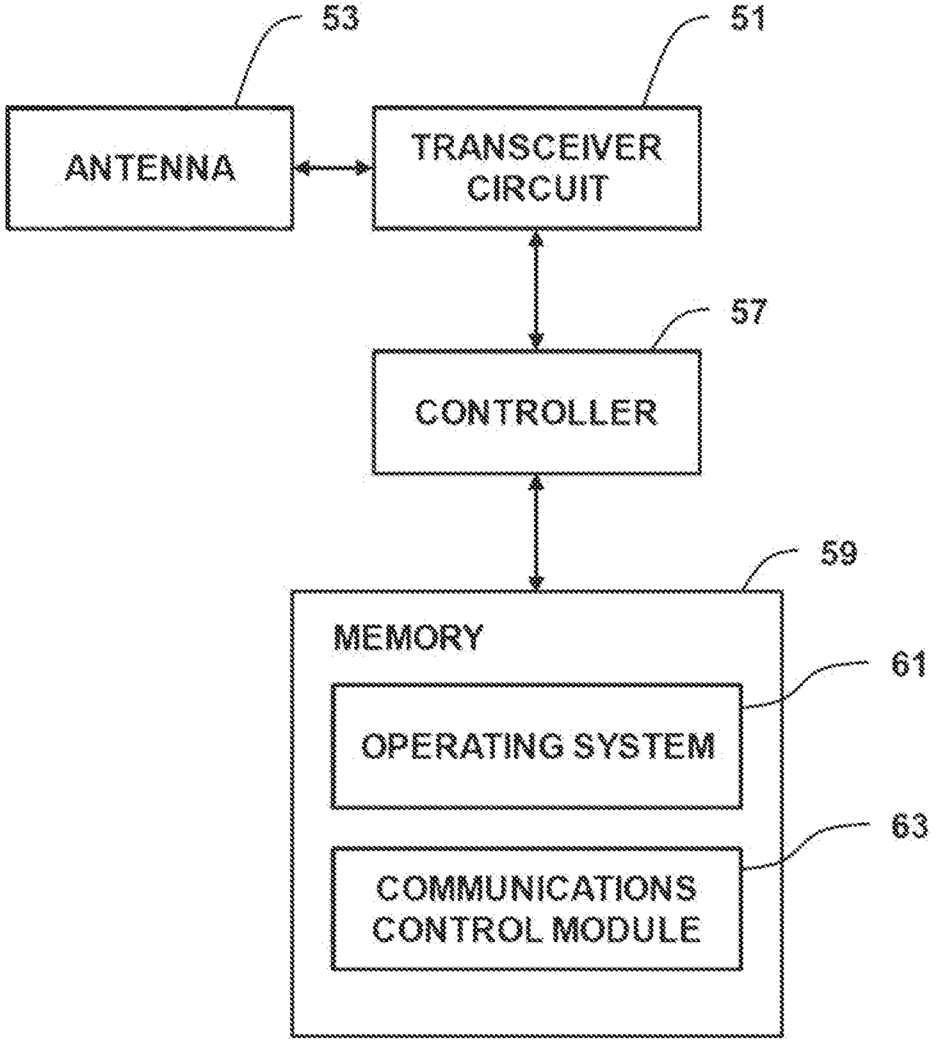
FIG. 3 is a schematic block diagram of an NTN node (e.g. satellite/UAS platform) forming part of the system shown in FIG. 1.
Figure 3:
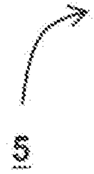

FIG. 3 is a block diagram illustrating the main components of the NTN node 5 (a satellite or a UAS platform) shown in FIG. 1. As shown, the NTN node 5 includes a transceiver circuit 51 which is operable to transmit signals to and to receive signals from at least one connected UE 3 via one or more antenna 53 and to transmit signals to and to receive signals from other network nodes such as gateways and base stations (either directly or indirectly). A controller 57 controls the operation of the NTN node 5 in accordance with software stored in a memory 59. The software may be pre-installed in the memory 59 and/or may be downloaded via the telecommunication network 1 or from a removable data storage device (RMD), for example. The software includes, among other things, an operating system 61, and a communications control module 63.

The communications control module 63 is responsible for handling (generating/sending/receiving) signalling between the NTN node 5 and other nodes, such as the UE 3, base stations 6, gateways, and core network nodes (via the base stations/gateways). The signalling may comprise control signalling related to HARQ processes/HARQ feedback (e.g. enabling/disabling HARQ feedback, per HARQ process).

Base Station/Gateway (Access Network Node)

Figure 4:
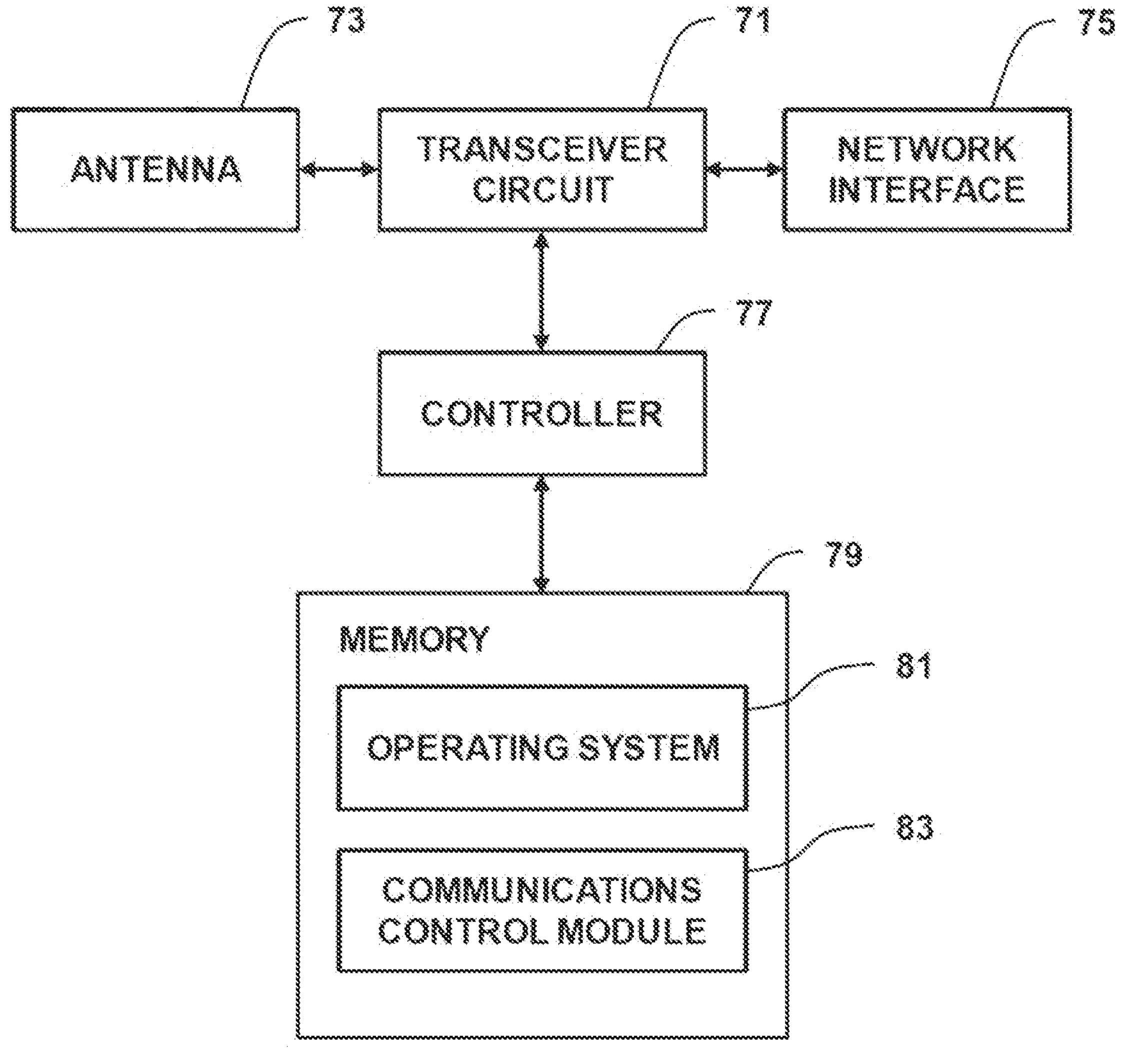
FIG. 4 is a schematic block diagram of an access network node (e.g. base station) forming part of the system shown in FIG. 1.
Figure 4:

FIG. 4 is a block diagram illustrating the main components of the gateway 6 shown in FIG. 1 (a base station (gNB) or a similar access network node). As shown, the gateway/gNB 6 includes a transceiver circuit 71 which is operable to transmit signals to and to receive signals from at least one connected UE 3 via one or more antenna 73 and to transmit signals to and to receive signals from other network nodes (either directly or indirectly) via a network interface 75. Signals may be transmitted to and received from the at least one UE 3 either directly and/or via the NTN node 5, as appropriate. The network interface 75 typically includes an appropriate base station—base station interface (such as X2/Xn) and an appropriate base station—core network interface (such as S1/NG-C/NG-U). A controller 77 controls the operation of the base station 6 in accordance with software stored in a memory 79. The software may be pre-installed in the memory 79 and/or may be downloaded via the telecommunication network 1 or from a removable data storage device (RMD), for example. The software includes, among other things, an operating system 81, and a communications control module 83.

The communications control module 83 is responsible for handling (generating/sending/receiving) signalling between the base station 6 and other nodes, such as the UE 3, NTN nodes 5, and core network nodes. The signalling may comprise control signalling related to HARQ processes/HARQ feedback (e.g. enabling/disabling HARQ feedback, per HARQ process).

DETAILED DESCRIPTION

3GPP TR 38.912 v16.0.0, section 8.2.2.2 provides the following overview of the HARQ codebooks and processes used in NR systems:

HARQ-ACK feedback with one bit per TB is supported. Operation of more than one downlink (DL) HARQ processes is supported for a given UE while operation of one DL HARQ process is supported for some UEs. The UE and NR (base station) each have a minimum HARQ processing time. The HARQ processing time at least includes a delay between DL data reception timing to the corresponding HARQ-ACK transmission timing and a delay between uplink (UL) grant reception timing to the corresponding UL data transmission timing.

From the UE's perspective, HARQ ACK/NACK feedback for multiple DL transmissions in time can be transmitted in one UL data/control region. Timing between DL data reception and corresponding acknowledgement is indicated by a field in the DCI from a set of values and the set of values is configured by higher layer. The at least one timing is defined at least for the case where the at least one timing is unknown to the UE.

Code Block Group (CBG) based transmission with single/multi-bit HARQ-ACK feedback is supported.

A more detailed description of some exemplary embodiments and features is provided below for the case when HARQ feedback is omitted (in cases when only disabled HARQ processes are transmitted within the $M_{A,c}$ occasions).

To avoid the ambiguity between the UE 3 and the base station 6, the base station 6 is configured to indicate to the UE 3 dynamically if HARQ-feedback is expected or not for the set of $M_{A,c}$ occasions.

In a first option, the base station 6 may use the DCI (e.g. an appropriate field thereof) to convey an appropriate indication to the UE 3 that only disabled HARQ processes would be/have been used for the UE 3 during the $M_{A,c}$ occasions. A new field may be defined in the DCI to indicate when HARQ feedback is not expected (or to indicate when HARQ feedback is expected). Alternatively, since some fields in the DCI are redundant (e.g. the PUCCH Resource Indicator 'PRI' field) for feedback disabled processes, when HARQ feedback is not expected, the base station 6 may reuse one of such redundant fields for the purpose of dynamically indicating whether HARQ-feedback is expected or not.

Based on the indication included in the DCI (i.e. based on the value of the appropriate field) the UE 3 can determine whether only disabled HARQ processes would be/have been used during the relevant $M_{A,c}$ occasions. When only disabled HARQ processes would be/have been used during the relevant $M_{A,c}$ occasions, the UE 3 may be configured to omit HARQ-feedback. Otherwise, when not all HARQ processes are disabled, the UE 3 may be configured to transmit an appropriate HARQ-feedback (i.e. when at least one HARQ process is enabled during the relevant $M_{A,c}$ occasions).

In a second option, the base station 6 may use the $M_{A,c}$ header to convey an appropriate indication (e.g. an appropriate value in the $M_{A,c}$ header) that only disabled HARQ processes would be/have been used for the UE 3 during the relevant $M_{A,c}$ occasions. In this case the UE 3 can determine whether only disabled HARQ processes would be/have been used during the relevant $M_{A,c}$ occasions, based on the indication included in the $M_{A,c}$ header, and transmit/omit HARQ-feedback accordingly.

When using the $M_{A,c}$ header for this purpose, the base station 6 may use a reserved value in the field to indicate to the UE 3 that no feedback is expected for the $M_{A,c}$ occasions. In this case, if the base station 6 knows that it does not need to schedule any feedback enabled HARQ processes for $M_{A,c}$ occasions, it can transmit a reserved value in the indicator field from the beginning. However, if the base station 6 is not sure in the beginning if it will need to schedule any enabled HARQ processes (due to, for example, a situation with lower number of disabled processes and uncertainty if there would be sudden arrival of heavy DL traffic) but discovers later that all processes would be HARQ disabled, the base station 6 can start transmitting reserved value in the indicator field from the occasion it is sure about it. Even if one instance of indicator field with reserved value is detected by the UE 3, the UE 3 can determine that no HARQ-ACK feedback is expected for the relevant $M_{A,c}$ occasions.

Regardless of which option is used, the benefits associated with the above described dynamic indication include:

- No/nominal additional signalling overhead; and
- No ambiguity between the base station 6 and the UE 3 in the case of DTX or DCI miss detection.

UE and Base Station Operation

The following is a more detailed description of some possible use cases and the procedures performed by the UE 3 and the base station 6, respectively, for dynamically omitting HARQ feedback (when only disabled HARQ processes are transmitted within the $M_{A,c}$ occasions).

Case 1: All HARQ Processes for a UE are Configured Disabled

- base station behaviour: always transmit reserved value in indicator field/expect no HARQ-ACK feedback from the UE 3.
- UE behaviour: even if one indicator field is correctly decoded, no HARQ-ACK feedback is transmitted.

It will be appreciated that in this case the UE 3 would ideally be aware that it does not have to transmit HARQ feedback anyways since all processes are configured disabled.

Case 2: The Base Station does not Need to Schedule any Feedback Enabled HARQ Processes within the Relevant $M_{A,c}$ Occasions

- base station behaviour: send reserved value in indicator field from the beginning/expect no HARQ-ACK feedback from the UE 3.
- UE behaviour: even if one instance of indicator field is correctly decoded, no HARQ-ACK feedback is transmitted (DTX and DCI missed detection is ignored (assumed to be HARQ disabled process)).

Case 3: The Base Station is not Sure if it Will Need to Schedule any Enabled HARQ Processes within the Relevant $M_{A,c}$ Occasions base station behaviour: start transmitting PDSCHs using feedback disabled HARQ processes without using reserved value of indicator field/transmit reserved value in the indicator field from the instance it can be sure there would not be a HARQ enabled process and no feedback is needed.

UE behaviour: even if one instance of indicator field is detected, ignore indicator field values in the previous HARQ disabled processes, and send no HARQ feedback for the $M_{A,c}$ occasions.

Case 4: At Least One SPS PDSCH Occasions Configured within the Relevant $M_{A,c}$ Occasions In this case the HARQ process number for a Semi-Persistent Scheduling (SPS) configuration is associated with the slot index. Therefore, the base station 6 cannot ensure all HARQ processes within the $M_{A,c}$ occasions are HARQ disabled without imposing strict scheduling restrictions or unless all HARQ processes for the UE 3 are configured disabled.

some base stations may be configured to support both 4G and 5G protocols, and/or any other 3GPP or non-3GPP communication protocols.

Figure 5:
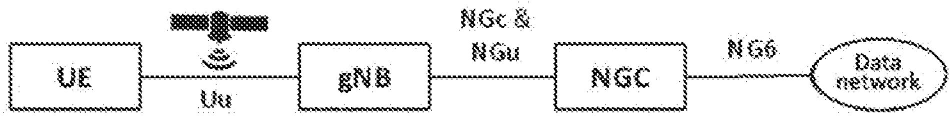
FIG. 5 illustrates schematically some exemplary architecture options for the provision of NTN features in the system shown in FIG. 1.
Figure 5:
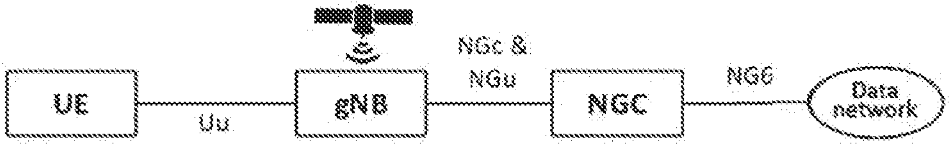
Figure 5:
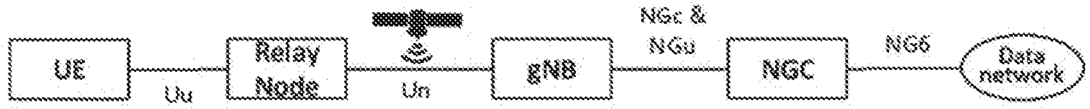
Figure 5:
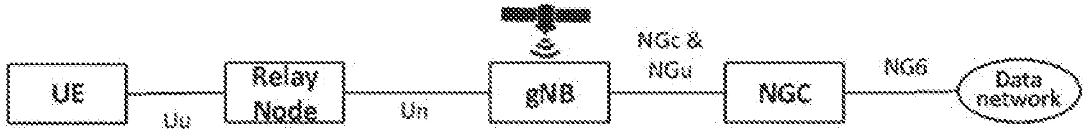

It will be appreciated that there are various architecture options to implement NTN in a 5G system, some of which are illustrated schematically in FIG. 5. The first option shown is an NTN featuring an access network serving UEs and based on a satellite/aerial with bent pipe payload and gNB on the ground (satellite hub or gateway level). The second option is an NTN featuring an access network serving UEs and based on a satellite/aerial with gNB on board. The third option is an NTN featuring an access network serving Relay Nodes and based on a satellite/aerial with bent pipe payload. The fourth option is an NTN featuring an access network serving Relay Nodes and based on a satellite/aerial with gNB. It will be appreciated that other architecture options may also be used, for example, a combination of two or more of the above described options. Alternatively, the relay node may comprise a satellite/UAS.

TABLE 1 types of satellites and UAS platforms

| Platforms | Altitude range | Orbit | Typical beam footprint size |
|---|---|---|---|
| Low-Earth Orbit (LEO) satellite | 300-1500 km | Circular around the earth | 100-1000 km |
| Medium-Earth Orbit (MEO) satellite | 7000-25000 km | | 100-1000 km |
| Geostationary Earth Orbit (GEO) satellite | 35 786 km | Notional station keeping position fixed in terms of elevation/azimuth with respect to a given earth point | 200-3500 km |
| UAS platform (including HAPS) | 8-50 km (20 km for HAPS) | | 5-200 km |
| High Elliptical Orbit (HEO) satellite | 400-50000 km | Elliptical around the earth | 200-3500 km |

In this case, codebook size reduction can be achieved as follows:

base station behaviour: start transmitting PDSCHs using feedback disabled HARQ processes w/o using reserved value of indicator field/transmit reserved value from the instance it can be sure there would not be a HARQ enabled process and no feedback is needed for all occasions except where at least one SPS PDSCH occasions are configured.

UE behaviour: even if one instance with reserved value of indicator field is detected, ignore indicator field values in the other HARQ disabled processes, and send HARQ ACK/NACK feedback only for the at least one SPS PDSCH occasion. ACK/NACK feedback is sent for all SPS PDSCH occasions irrespective of the HARQ process number.

MODIFICATIONS AND ALTERNATIVES

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

It will be appreciated that the above embodiments may be applied to both 5G New Radio and LTE systems (E-UTRAN). A base station (gateway) that supports E-UTRA/4G protocols may be referred to as an 'eNB' and a base station that supports NextGeneration/5G protocols may be referred to as a 'gNBs'. It will be appreciated that The above embodiments use a system comprising a non-terrestrial portion as an example. However, it will be appreciated that HARQ processes may be disabled in other types of systems as well (e.g. NR systems without NTN functionality or in systems using a combination of NTN and NR cells). The above embodiments are therefore applicable to any system employing disabled HARQ processes for which a dynamic indication can be provided for controlling whether to provide/omit associated HARQ feedback.

In the above description, the UE, the NTN node (satellite/UAS platform), and the access network node (base station) are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the NTN node, and the access network node (base station) as a signal over a computer network, or on a recording medium. Further, the functionality performed by part or all of this software may be performed using one or more dedicated hardware circuits. However, the use of software modules is preferred as it facilitates the updating of the UE, the NTN node, and the access network node (base station) in order to update their functionalities.

The above embodiments are also applicable to 'non-mobile' or generally stationary user equipment. The above described mobile device may comprise an MTC/IoT device and/or the like.

The information from the network node indicating whether HARQ feedback is required for a set of transmission occasions may be included in a Downlink Control Information (DCI). For example, the information may be included in a PUCCH Resource Indicator (PRI) field of the DCI. Alternatively, the information may be included in a Medium Access Control (MAC) header.

The HARQ feedback may comprise a Type-1 HARQ feedback.

When the received information indicates that HARQ feedback is not required for a set of transmission occasions, the method may comprise omitting HARQ feedback for that set of transmission occasions.

The method performed by the UE may further comprise: detecting a missed Discontinuous Transmission (DTX) or a missed DCI; and ignoring said missed DTX or DCI when the received information indicates that HARQ feedback is not required for a set of transmission occasions.

The UE may be configured to communicate using a Semi-Persistent Scheduling (SPS), in which case the method may comprise: when the received information indicates that HARQ feedback is not required for a transmission occasion associated with a slot index, transmitting HARQ feedback for SPS transmission in a slot having that slot index.

When the UE is configured to communicate using a Semi-Persistent Scheduling (SPS), the method performed by the network node may further comprise: when the received information indicates that HARQ feedback is not required for a transmission occasion associated with a slot index, receiving HARQ feedback for SPS transmission in a slot having that slot index.

The network node may comprise a base station apparatus or a gateway.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

Discussion on HARQ enhancements for NR NTN

1. INTRODUCTION

The work item on solutions for NR to support non-terrestrial networks (NTN) was approved at RAN #86 and one objective is to specify HARQ enhancements for NTN.

More specifically, according to the WID [1], HARQ enhancements as follows should be specified in RAN1:

Number of HARQ process

Enabling/disabling of HARQ feedback as described in the TR 38.821

In this contribution, we discuss our views on enhancements for HARQ-ACK codebooks when HARQ-ACK information is disabled, HARQ process ID indication and restriction on HARQ feedback disabling.

2. DISCUSSION

2.1 HARQ-ACK Codebook Enhancements

In RAN1 #102-e meeting, it was agreed that enabling/disabling on HARQ feedback for downlink transmission should be at least configurable per HARQ process via UE specific RRC signaling. To avoid redundant feedback overhead, following agreements were made in relation to HARQ-ACK codebook enhancement in RAN1 #104-e meeting [2].

Agreement:

For Type-2 HARQ codebook in NTN: Reduce codebook size with HARQ-ACK codebook only including HARQ-ACK of PDSCH with feedback-enabled HARQ processes FFS: The details of C-DAI and T-DAI counting for DCI of PDSCH with feedback-enable/disabled HARQ processes.

For type-1 HARQ-ACK codebook, following options have been discussed without any agreement:

Option-1: No enhancement.

Option-2: Report NACK on disabled process

Option-3: Reduce codebook size with criteria

Option-1, i.e., no enhancement is considered a straightforward way which can avoid any spec impacts. However, it needs to be clarified whether UE follows the legacy behaviour to generate ACK/NACK for disabled HARQ processes. If legacy behaviour is not followed, Option-2 seems preferable choice for semi-static HARQ codebook determination. However, when only few HARQ processes are enabled and with the extension of maximal supported HARQ process number to 32, enhancements for type-1 HARQ-ACK codebook can be useful to reduce redundant overhead. In our view, following cases can be considered for Type-1 codebook enhancement:

Case-1: All HARQ process for one UE are configured as disabled.

Case-2: All HARQ process used for scheduling in $M_{A,c}$ occasions are disabled;

In our opinion, when all HARQ processes for a UE are configured disabled, HARQ-ACK report can be omitted without any concerns of ambiguity between gNB and UE.

Proposal 1: When all HARQ Processes for a UE are Configured Disabled, HARQ-ACK Feedback is Omitted.

Similarly to case-1, HARQ-ACK feedback can be omitted in case when HARQ processes used for scheduling in $M_{A,c}$ occasions are disabled. However, concerns were raised in the previous meeting that this can cause ambiguity between gNB and UE since UE cannot know all HARQ processes are disabled in case of DTX and DCI miss detection. In our view, ambiguity can be avoided by signalling to the UE that all HARQ processes in $M_{A,c}$ occasions are disabled. Following two options can be considered for signalling this information to the UE.

Option 1: DCI conveys indication that only disabled HARQ processes would be/have been used for the UE during the $M_{A,c}$ occasions. Since some fields in the DCI are redundant (e.g., PRI) for feedback disabled processes, when HARQ feedback is not expected, it is proposed to reuse one of those redundant fields. A reserved value in the indication field can inform the UE that no feedback is expected for the $M_{A,c}$ occasions.

Option 2: Layer 2 conveys indication that only disabled HARQ processes would be/have been used for the UE during the $M_{A,c}$ occasions. For instance, MAC CE or one bit in MAC header can be used for this indication.

Such dynamic indication can alleviate concerns on ambiguity due to DCI miss detection or DTX and can be beneficial to reduce redundant UL overhead. For instance, considering option 1, if gNB knows that it does not need to schedule any feedback enabled HARQ processes for $M_{A,c}$ occasions, it can transmit reserved value in the indicator field from the beginning. However, if gNB is not sure in the beginning if it will need to schedule any enabled HARQ processes (due to, for example. a situation with lower number of disabled processes and uncertainty if there would be sudden arrival of heavy DL traffic) but discovers later that all processes would be HARQ disabled, it can start transmitting DCI with the reserved value of the indicator field from the occasion it is sure about it. Even if one DCI is successfully decoded with the reserved value in the indicator field, UE would know that no HARQ-ACK feedback is expected for the $M_{A,c}$ occasions.

Observation 1: Dynamic indication to inform the UE if HARQ-feedback is expected or not for $M_{A,c}$ occasions can be useful to reduce codebook size.

Proposed dynamic indication mechanism can also be useful for reducing the Type-1 codebook size when at least one SPS PDSCH occasion are configured within $M_{A,c}$ occasions. HARQ process number for SPS configuration is associated with the slot index. Therefore, gNB cannot ensure that all HARQ processes within $M_{A,c}$ occasions are HARQ disabled without imposing strict scheduling restrictions or unless all HARQ processes for the UE are configured disabled. However, SPS PDSCH occasions are known to the UE. Therefore, codebook size reduction can be achieved as follows:

gNB behavior: Start transmitting PDSCHs using feedback disabled HARQ processes without setting indicator field to the value which implies no feedback is expected for the $M_{A,c}$ occasions. Transmit layer-1 or layer-2 indicator field, depending on whether option 1 or option 2 is adopted, with reserved value from the instance it can be sure there would not be a HARQ enabled process and no feedback is needed for all occasions except where at least one SPS PDSCH occasions are configured.

UE behavior: Even if one instance of indicator field with reserved value is detected, ignore indicator field values in the other HARQ disabled processes; and send HARQ A/N feedback only for the at least one SPS PDSCH occasion. To avoid ambiguity due to DTX, it is proposed that ACK/NACK feedback is sent for all SPS PDSCH occasions irrespective of the HARQ process number in this case.

Observation 2: Codebook size reduction can be achieved if only HARQ disabled processes and SPS PDSCHs are scheduled in $M_{A,c}$ occasions.

Proposal 2: Type-1 codebook enhancement is supported as:

Layer1/Layer2 signalling is used to indicate that only HARQ disabled processes are scheduled in $M_{A,c}$ occasions.

If there are no SPS PDSCH configured within $M_{A,c}$ occasion, UE omits HARQ feedback.

If there is at least one SPS PDSCH configured within $M_{A,c}$ occasion, UE omits HARQ feedback for non SPS PDSCH occasions.

UE reports HARQ feedback for all SPS PDSCH occasions irrespective of their HARQ process number.

3. CONCLUSION

From the discussion, we have the following observations and proposals.

Proposal 1: When all HARQ processes for a UE are configured disabled, HARQ-ACK feedback is omitted.

Observation 1: Dynamic indication to inform the UE if HARQ-feedback is expected or not for $M_{A,c}$ occasions can be useful to reduce codebook size.

Observation 2: Codebook size reduction can be achieved if only HARQ disabled processes and SPS PDSCHs are scheduled in $M_{A,c}$ occasions.

Proposal 2: Type-1 codebook enhancement is supported as:

Layer1/Layer2 signalling is used to indicate that only HARQ disabled processes are scheduled in $M_{A,c}$ occasions.

If there are no SPS PDSCH configured within $M_{A,c}$ occasion, UE omits HARQ feedback.

If there is at least one SPS PDSCH configured within $M_{A,c}$ occasion, UE omits HARQ feedback for non SPS PDSCH occasions.

UE reports HARQ feedback for all SPS PDSCH occasions irrespective of their HARQ process number.

4. REFERENCES

[1] RP-193234, "NR-NTN: Solutions for NR to support non-terrestrial networks (NTN)", RAN #86, December 2019.

[2] RAN1 Chairman's Note, 3GPP TSG RAN WG1 Meeting #104-e, e-Meeting, Jan. 25-Feb. 5, 2021.

For example, the whole or part of the exemplary embodiments disclosed above can be described as, but not limited to, the following supplementary notes.

Supplementary Note 1

A method performed by a user equipment (UE) configured to communicate via a non-terrestrial network, the method comprising:

receiving, from a network node, information indicating whether Hybrid Automatic Repeat Request (HARQ) feedback is required for a set of transmission occasions; and transmitting or omitting the HARQ feedback for the set of transmission occasions based on the information.

Supplementary Note 2

The method according to note 1, wherein the information is included in a Downlink Control Information (DCI).

Supplementary Note 3

The method according to note 2, wherein the information is included in a Physical Uplink Control Channel (PUCCH) Resource Indicator (PRI) field of the DCI.

Supplementary Note 4

The method according to note 1, wherein the information is included in a Medium Access Control (MAC) header.

Supplementary Note 5

The method according to any one of notes 1 to 4, wherein the HARQ feedback includes a Type-1 HARQ feedback.

Supplementary Note 6

The method according to any one of notes 1 to 5, wherein in a case where the information indicates that the HARQ feedback is not required for the set of transmission occasions, the omitting the HARQ feedback for the set of transmission occasions is performed.

Supplementary Note 7

The method according to any one of notes 1 to 6, further comprising: detecting a missed Discontinuous Transmission (DTX) or a missed DCI; and ignoring the missed DTX or the missed DCI in a case where the information indicates that the HARQ feedback is not required for the set of transmission occasions.

Supplementary Note 8

The method according to any one of notes 1 to 7, wherein in a case where the UE is configured to communicate using a Semi-Persistent Scheduling (SPS), the method further comprises:

in a case where the information indicates that the HARQ feedback is not required for at least one of the set of transmission occasions associated with a slot index, transmitting HARQ feedback for SPS transmission in a slot having the slot index.

Supplementary Note 9

A method performed by a network node configured to communicate with a user equipment (UE) via a non-terrestrial network, the method comprising:

transmitting, to the UE, information indicating whether Hybrid Automatic Repeat Request (HARQ) feedback is required for a set of transmission occasions; and receiving or omitting the HARQ feedback for the set of transmission occasions based on the information.

Supplementary Note 10

The method according to note 9, wherein the information is included in a Downlink Control Information (DCI).

Supplementary Note 11

The method according to note 10, wherein the information is included in a Physical Uplink Control Channel (PUCCH) Resource Indicator (PRI) field of the DCI.

Supplementary Note 12

The method according to note 9, wherein the information is included in a Medium Access Control (MAC) header.

Supplementary Note 13

The method according to any one of notes 9 to 12, wherein the HARQ feedback includes a Type-1 HARQ feedback.

Supplementary Note 14

The method according to any one of notes 9 to 13, wherein in a case where the UE is configured to communicate using a Semi-Persistent Scheduling (SPS), the method further comprises:

in a case where the information indicates that the HARQ feedback is not required for at least one of the set of the transmission occasions associated with a slot index, receiving the HARQ feedback for SPS transmission in a slot having the slot index.

Supplementary Note 15

The method according to any one of notes 9 to 14, wherein the network node includes a base station or a gateway.

Supplementary Note 16

The method according to any one of notes 1 to 15, wherein the information indicates that only disabled HARQ processes are used for transmission during each occasion for the transmission occasions.

Supplementary Note 17

A user equipment (UE) configured to communicate via a non-terrestrial network, the UE comprising:

means for receiving, from a network node, information indicating whether Hybrid Automatic Repeat Request (HARQ) feedback is required for a set of transmission occasions; and means for transmitting or omitting the HARQ feedback for the set of transmission occasions based on the information.

Supplementary Note 18

A network node configured to communicate with a user equipment (UE) via a non-terrestrial network, the network node comprising:

means for transmitting, to the UE, information indicating whether Hybrid Automatic Repeat Request (HARQ) feedback is required for a set of transmission occasions; and means for receiving or for omitting the HARQ feedback for the set of transmission occasions based on the information.

This application is based upon and claims the benefit of priority from Great Britain Patent Application No. 2104751.9, filed on Apr. 1, 2021, the disclosure of which is incorporated herein in its entirety by reference.

REFERENCE SIGNS LIST

1 Mobile telecommunication system
3 Users of mobile devices
5 Satellite
6 Base station
7 Data network

31 Transceiver circuit
33 Antenna
35 User interface
37 Controller
39 Memory
41 Operating system
43 Communications control module
51 Transceiver circuit
53 Antenna
57 Controller
59 Memory
61 Operating system
63 Communications control module
71 Transceiver circuit
73 Antenna
75 Network interface
77 Controller
79 Memory
81 Operating system
83 Communications control module

What is claimed is:

1. A method performed by a user equipment (UE) configured to communicate via a non-terrestrial network, the method comprising:

receiving, from a network node, first information indicating whether Hybrid Automatic Repeat Request (HARQ) feedback is enabled per HARQ process;

receiving Downlink Control Information (DCI) from the network node, wherein the DCI includes, in a field designated to indicate second information about a HARQ resource, third information indicating whether the HARQ feedback is enabled for a set of occasions for candidate Physical Downlink Shared Channel (PDSCH) receptions corresponding to the DCI; and determining whether to transmit the HARQ feedback for the set of occasions based on the third information, wherein the third information overrides the first information.

2. The method according to claim 1, further comprising:

detecting a missed Discontinuous Transmission (DTX) or a missed DCI; and ignoring the missed DTX or the missed DCI in a case where the information indicates that the HARQ feedback is not enabled for the set of the occasions.

3. The method according to claim 1, wherein in a case where the UE is configured to communicate using a Semi-Persistent Scheduling (SPS), the method further comprises:

in a case where the information indicates that the HARQ feedback is not enabled for at least one of the set of the occasions included in a slot having a slot index, transmitting HARQ feedback for SPS transmission in a slot having the slot index.

4. A method performed by a network node configured to communicate with a user equipment (UE) via a non-terrestrial network, the method comprising:

transmitting, to the UE, first information indicating whether Hybrid Automatic Repeat Request (HARQ) feedback is enabled per HARQ process;

transmitting Downlink Control Information (DCI) to the UE, wherein the DCI includes, in a field designated to indicate second information about a HARQ resource, third information indicating whether the HARQ feedback is enabled for a set of occasions for candidate Physical Downlink Shared Channel (PDSCH) transmissions corresponding to the DCI; and wherein the UE determines whether to transmit the HARQ feedback for the set of occasions based on the third information, wherein the third information overrides the first information.

5. The method according to claim 4, wherein in a case where the UE is configured to communicate using a Semi-Persistent Scheduling (SPS), the method further comprises:

in a case where the information indicates that the HARQ feedback is not enabled for at least one of the set of the transmission occasions associated with a slot index, receiving the HARQ feedback for SPS transmission in a slot having the slot index.

6. A user equipment (UE) configured to communicate via a non-terrestrial network, the UE comprising:

a memory storing instructions; and at least one processor configured to process the instructions to:

receive, from a network node, first information a signalling including information indicating whether Hybrid Automatic Repeat Request (HARQ) feedback is enabled per HARQ process;

receive Downlink Control Information (DCI) from the network node, wherein the DCI includes, in a field designated to indicate second information about a HARQ resource, third information indicating whether the HARQ feedback is enabled for a set of occasions for candidate Physical Downlink Shared Channel (PDSCH) receptions corresponding to the DCI; and determining whether to transmit the HARQ feedback for the set of occasions based on the third information, wherein the third information overrides the first information.

7. A network node configured to communicate with a user equipment (UE) via a non-terrestrial network, the network node comprising:

a memory storing instructions; and at least one processor configured to process the instructions to:

transmit, to the UE, first information indicating whether Hybrid Automatic Repeat Request (HARQ) feedback is enabled per HARQ process;

transmit Downlink Control Information (DCI) to the UE, wherein the DCI indicates, in a field designated to indicate second information about a HARQ resource, third information indicating whether the HARQ feedback is enabled for a set of occasions for candidate Physical Downlink Shared Channel (PDSCH) transmissions corresponding to the DCI; and wherein the UE determines whether to transmit the HARQ feedback for the set of the occasions based on the third information, wherein the third information overrides the first information.

* * * * *